United States Patent [19]

Sharp

[11] Patent Number: 5,547,231
[45] Date of Patent: Aug. 20, 1996

[54] FITTINGS FOR USE WITH DOUBLE WALL PIPELINE SYSTEMS HAVING SUPPORT FINS

[76] Inventor: Bruce R. Sharp, 126 Leland Way, Marco Island, Fla. 33937

[21] Appl. No.: 335,074

[22] Filed: Nov. 7, 1994

Related U.S. Application Data

[63] Continuation-in-part of Ser. No. 150,361, Nov. 9, 1993, Pat. No. 5,456,502, which is a continuation-in-part of Ser. No. 876,505, Apr. 30, 1992, Pat. No. 5,259,651, which is a continuation-in-part of Ser. No. 680,513, Apr. 4, 1991, abandoned.

[51] Int. Cl.$^6$ .................................................... F16L 9/18
[52] U.S. Cl. ........................ 285/133.1; 285/156; 285/343; 285/138
[58] Field of Search .............................. 285/138, 133.1, 285/156, 343, 342

[56] References Cited

U.S. PATENT DOCUMENTS

| | | | |
|---|---|---|---|
| 3,372,715 | 3/1968 | Ashton | 285/133.1 |
| 4,732,414 | 3/1988 | Inaba | 285/133.1 |
| 4,871,196 | 10/1989 | Kingsford | 285/138 |
| 4,922,971 | 5/1990 | Grantham | 285/133.1 |
| 5,054,523 | 10/1991 | Rink | 285/133.1 |
| 5,203,378 | 4/1993 | Williams | 285/133.1 |
| 5,259,651 | 11/1993 | Sharp | 285/138 |
| 5,398,977 | 3/1995 | Berger et al. | 285/133.1 |
| 5,449,203 | 9/1995 | Sharp | 285/133.1 |

FOREIGN PATENT DOCUMENTS

659362   3/1963   Canada ................ 285/133.1

*Primary Examiner*—Eric K. Nicholson
*Attorney, Agent, or Firm*—Charles R. Wilson

[57] ABSTRACT

A double wall compression fitting is dimensioned for attachment to a double wall pipeline system having an inner pipeline and an outer pipeline. The pipelines have a multiplicity of longitudinally running support fins running between them to maintain a spaced relationship. The fitting is comprised of an inner housing having at least two terminals, an outer housing encasing the inner housing in a manner to form an annular space therebetween and a compression connecting assembly. The compression connection assembly connects the inner and outer housings to the double wall pipeline system so that the annular space between the housings is in communication with an annular space between the pipelines of the double wall pipeline system. The compression connecting assembly includes a coupler with means to compress it to form a compression seal with the outer pipeline.

20 Claims, 6 Drawing Sheets

FITTINGS FOR USE WITH DOUBLE WALL PIPELINE SYSTEMS HAVING SUPPORT FINS

This is a continuation-in-part of Ser. No. 08/150,361, filed Nov. 9, 1993 now U.S. Pat. No. 5,456,502, "Fittings For Use With Fin Strengthened Double Wall Pipeline Systems" which is a continuation-in-part of Ser. No. 07/876,505, filed Apr. 30, 1992 "Double Wall Fittings For Use With Double Wall Pipeline System", now U.S. Pat. No. 5,259,651, which is a continuation-in-part of Ser. No. 07/680,513, filed Apr. 4, 1991, "Double Wall Fittings For Use With Double Wall Pipeline Systems", now abandoned.

This invention relate to fittings for use on pipeline systems for conveying liquids. More particularly, the invention relates to double walled fittings for use on double wall pipeline systems.

BACKGROUND OF THE INVENTION

Pipelines are used extensively for conveying liquids. One area where pipelines are used is in the transporting of liquid from bulk storage tanks. Many types of liquids are stored in bulk, both above ground and underground. A special problem exists with leaks in the pipelines used in connection with underground storage tanks. If the liquid being conveyed is a danger to the environment or the health when not controlled, substantial damage can occur before the leak is even detected. A good example of this are the pipelines used to convey liquid gasoline at retail gasoline service stations. Necessarily, these stations are in populated areas and therefore there is always a danger associated with leaks from the tanks or pipelines associated therewith.

Leaked gasoline poses a hazard to the environment as well as an obvious health hazard. Any leak which develops is normally very slow initially. This means that the leak is difficult to detect until a substantial amount of gasoline has leaked. By that time environmental damage and possible health problems have occurred.

Various attempts have been made to alleviate the problems associated with underground pipelines, including use of double walled pipeline systems. In this type of system, an outer pipeline wall acts as a containment vessel if an inner pipeline wall develops a leak. A slow leak in the pipeline is satisfactorily contained. A particularly attractive double wall pipeline system which is becoming popular has a set of longitudinally running internal support fins between the inner and outer pipelines for strengthening purposes. However, installation of these double walled pipelines is difficult.

A problem experienced with those double wall pipeline systems having internal support fins is the need for special fittings. Straight fittings, elbows and T-fittings are often used in connecting a pipeline terminal to another pipeline terminal, dispenser, etc. Known fittings used on conventional single wall pipelines are not able to maintain a segregation of the inner pipeline flow channel from the outer pipeline flow channel. The lack of reliable easy to use fittings for use on the double wall pipeline systems of the type discussed above has reduced the attractiveness of such systems.

There has now been discovered double wall fittings especially adapted for double wall pipeline systems having internal support fins. The fittings solve many of the problems inherent with the existing fitting systems. The fittings of this invention are economical and provide a means of connecting not available previously.

SUMMARY OF THE INVENTION

A double wall compression fitting is dimensioned for attachment to a double wall pipeline system having an inner pipeline and an outer pipeline with a multiplicity of longitudinally running support fins. The fitting is comprised of an inner housing having at least two terminals, an outer housing encasing the inner housing in a manner to form an annular space therebetween and a compression connecting assembly. The connecting assembly is capable of connecting the inner and outer housings to the double wall pipeline system so that an annular space between the housings is in communication with an annular space between the inner and outer pipelines of the double wall pipeline system. The compression connecting assembly has a coupler with means to form a compression seal with the outer pipeline while maintaining communication between the annular space of the double wall pipeline system and the annular space between the housings.

DETAILED DESCRIPTION OF THE INVENTION

Figure 1:
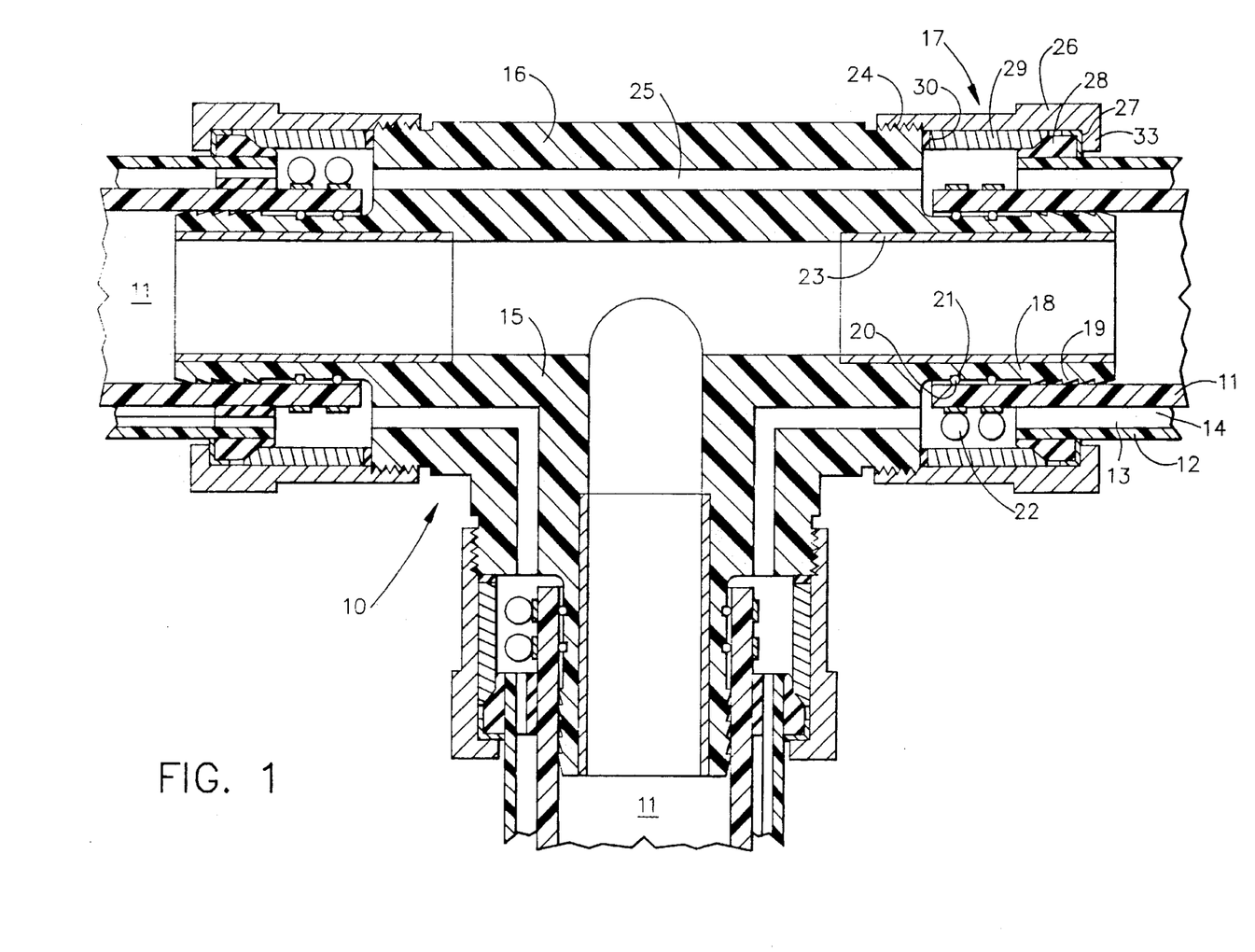
FIG. 1 is a side view in section of a double wall fitting of the invention attached to double wall pipeline systems.

The double wall compression fittings of the invention are useful with double wall pipeline systems having internal support fins. The fitting 10 depicted in FIG. 1 is a T-fitting having three terminals, each connected to a double wall pipeline system. Other fittings such as two terminal straight fittings, i.e. couplers, two terminal elbow fittings and four terminal cross fittings are within the scope of the invention and readily adapted from the disclosure of the T-fittings which follow.

Figure 2:
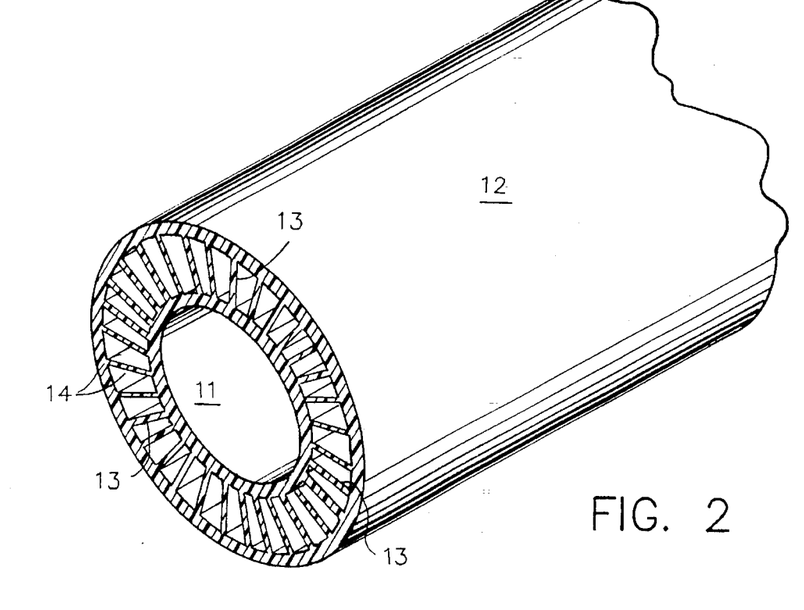
FIG. 2 is a view in perspective, in section, of the double wall pipeline system used with the double wall fitting shown in FIG. 1.
Figure 3:
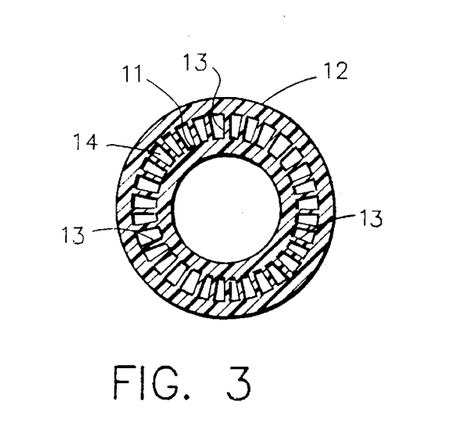
FIG. 3 is an end view in cross-section of the pipeline system of FIG. 2.

First with respect to FIGS. 2 and 3 there is shown a double wall pipeline system wherein the fittings of the invention are most useful. Such pipeline systems are commercially available. The system comprises an inner pipeline 11, an outer pipeline 12 and a multiplicity of longitudinally running support fins 13. The pipeline system is a double wall pipeline of generally one piece construction. The inner pipeline has an outside diameter which ranges from about one-half inch to about twelve inches, depending on the liquid being conveyed and the purpose. Smaller and larger inner pipelines are feasible though generally find use in only very specialized technologies, such as medical technology and bulk water transport technology as found in airport hydrant systems. The outer pipeline is dimensioned to encase the inner pipeline with a minimal amount of clearance to conserve raw material usage. An annular space 14 is formed between the two pipelines. The length of the pipeline system can range widely depending on use, though generally as manufactured it will range from about three feet to about five hundred feet in length. A preferred length of the pipeline system for manufacturing purposes is from about six feet to about two hundred and fifty feet.

The wall thickness of the inner pipeline is dimensioned so as to be capable of withstanding at least about twice the operating pressure. Preferably, the system of the invention is capable of withstanding at least about 100 psi in the inner pipeline and at least about 10 psi in the outer pipeline. Necessarily, the inner pipeline conveying the liquid will constantly have the greater internal pressure. Any leakage which may occur will be into the larger capacity outer pipeline with a consequent step down in pressure. More preferably, the inner pipeline is capable of withstanding from about 100 psi to about 200 psi and the outer pipeline is capable of withstanding from about 10 psi to about 75 psi. Inner and outer pipeline thicknesses of from about 50 mils to about 350 mils is sufficient for these pressures.

The multiplicity of longitudinally running support fins 13 extend from the inner pipeline 11 to the outer pipeline 12. Each fin is preferably permanently joined to the wall of each pipeline so as to structurally tie the pipelines together. It is preferably perpendicular to each pipeline wall as best seen in FIG. 3. The resultant pipeline system is a one piece construction. Each pipeline supports the other pipeline through the support fins. Additionally, the multiple support fins are able to absorb inwardly directed forces from the connecting assembly without a distortion in the pipelines occurring. That is, the general shape of the outer pipeline is retained. This ensures that a seal with the connecting assembly is retained and communication between the annular spaces is retained. The multiplicity of support fins eliminates the need for a spacer between the pipelines to prevent a crushing of either pipeline.

From three to twenty support fins per circumferential inch are preferred with five to ten support fins per circumferential inch more preferred. The greater number of support fins in these preferred systems does allow a reduced fin thickness without a loss of overall strength. Thus, support fins of from about 25 mils to about 250 mils in thickness are sufficient. Generally, a greater pipeline system strength is achieved with increasing numbers of support fins, though a point ultimately is reached where there results no noticeable strengthening. Increased strengthening also results with increased pipeline wall thickness, especially the inner pipeline which conveys the liquid and thus is subjected to the greater operating pressure.

Figure 4:
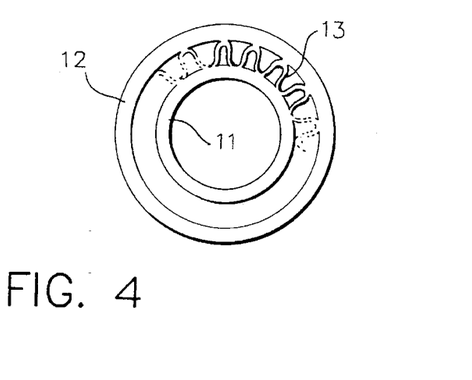
FIG. 4 is an end view in cross-section of another double wall pipeline system used with the double wall fitting of the invention.

FIG. 4 illustrates another double wall pipeline system used with the fittings of the invention. The inner and outer pipelines are the same as described with respect to the double wall pipeline system of FIGS. 2 and 3. However, the longitudinally running internal support fins are corrugated-shaped. Each rounded corrugation represents a support fin. Such pipeline systems are commercially available and are usable herein.

Again with reference to FIG. 1, there is shown the double wall compression fitting 10 having three terminals. The fitting 10 is used to connect three separate double wall pipeline systems. In accord with this invention, the fitting 10 used for the double wall pipeline systems ensures that the flow paths of liquid in the inner pipeline remains separate when passing through the fitting. Thus, each inner pipeline is connected to the fitting in a sealed manner so that liquid which flows through one inner pipeline will be forced to flow into one or more other inner pipelines. Similarly, a common separate path connects the annular spaces 14 between the three pipelines.

The double wall compression fitting 10 is comprised of an inner housing 15, an outer housing 16 substantially encasing the inner housing and a compression connecting assembly 17. Each of the components is described in detail below.

The inner housing 15 is preferably a one piece construction. The interior of it forms a flow path connecting the flow of liquid through the inner pipelines of the double wall pipeline systems. It is shown as made of a rigid plastic. It can as well be made of other materials, including steel or cast iron. Each leg of the inner housing has an externally recessed terminal 18, preferably with a series of ridges 19 extending around its circumference to better engage the inner pipeline and retain it when placed thereover. Preferably, though not necessary, O-rings 20 are positioned on the recessed terminals in O-ring grooves 21 to provide a seal with the inner pipeline. Band clamps 22 are also provided to compress the inner pipeline and O-rings onto the inner housing terminals to ensure a liquid-tight seal. Preferably, also, a metal reinforcing sleeve 23 is inserted in the terminals of the inner housing to keep them from collapsing.

The outer housing 16 substantially encases the inner housing 15. It has the same general shape, though its legs are shorter to allow access to the band clamps for tightening purposes. It is shown as made of a rigid plastic. It can as well be formed from other rigid materials or elastomeric materials. A terminal of each leg has exterior threads 24. An annular space 25 between the housings is formed which is in communication with the annular space 14 between the double wall pipelines through the compression connecting assembly described below.

The compression connecting assembly 17 is used to connect the outer pipelines of the double wall pipeline system to the outer housings of the T-fitting 10 in a sealed fashion while preserving the integrity of the liquid flow path and the annular space flow path. The compression connecting assembly 17 is comprised of an internally threaded coupler nut 26 dimensioned to engage the threads on the terminal of the outer housing 16, and a gasket bearing retainer 27, a compression seal 28, a ram compression seat 29, and a gasket 30. The coupler nut 26 has an annular flange 33 extending inwardly at its head. The gasket bearing retainer 27 is a rigid ring with an inside diameter sufficiently large to fit over the outer pipeline 12 and further has a right angle leg which extends from the ring portion. The purpose of the retainer 27 is to receive force from the coupler nut when tightened and transmit it to the compression seal and at the same time confine the compression seal. A secondary benefit realized from the retainer is that it prevents the compression seal from binding against the coupler nut.

The compression seal 28 is a compressible ring which also has an inside diameter sufficient to fit over the outer pipeline and an outer diameter sufficient to be fit within the coupler nut 26 and gasket bearing retainer 27. The compression seal when compressed forms a seal between the outer pipeline 12 and the connecting assembly of the fitting 10.

The ram compression seat 29 is a rigid elongated sleeve which fits within the coupler nut. It has a length sufficient to contact the compression seal and outer housing end edge when the coupler nut 26 is tightened. The ram compression seat 29 and ring gasket 30 seated at the housing's end edge aid in forming a seal between the outer pipeline and outer housing.

The support fins between the inner and outer pipelines at their terminals prevent the pipelines from being crushed by compressive forces imparted by the coupler nut 26 and compression seal 28 to the extent that the annular space communication is impaired. Most importantly, tightening of the outer coupler nut 26 forces the gasket bearing retainer 27, compression seal 28, ram compression seat 29 and gasket 30 together to form a seal on the outside wall of the outer pipeline to ensure that the annular space between the pipelines is closed to the outside.

It should be apparent that the fitting 10 is capable of attachment to a double wall pipeline system in a manner wherein the flow path of the inner pipeline remains the same and segregated and the annular space flow path between the pipelines remains the same and segregated. As such, liquid is able to flow through the inner pipeline of a double wall pipeline system, through the inner housing of the fitting and then through one or more inner pipelines of other double wall pipeline systems connected to the fitting. All the while, a continuous annular space is maintained.

Figure 5:
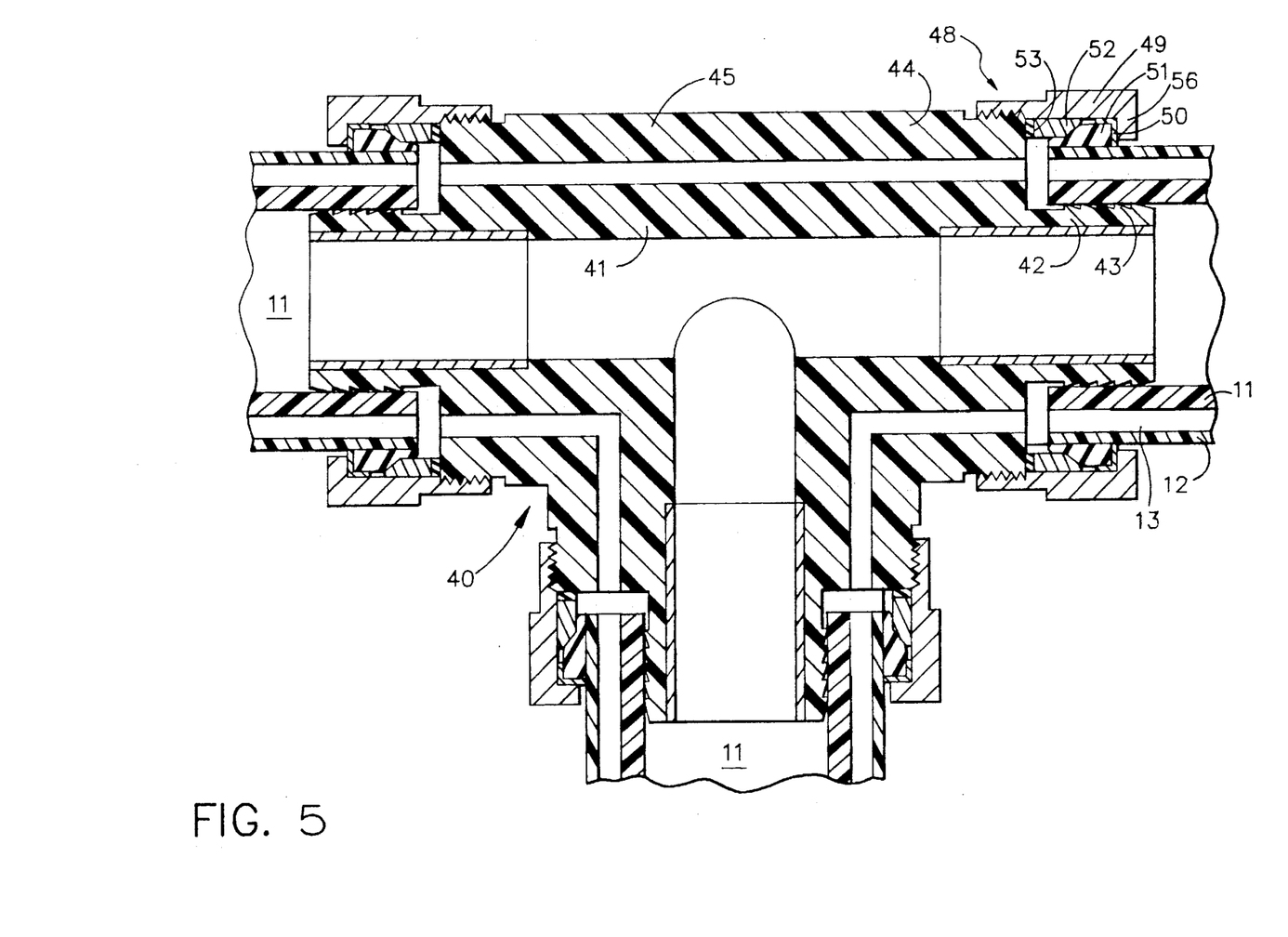
FIG. 5 is a side view in section of another double wall fitting of the invention.

FIG. 5 also shows a double wall T-fitting 40 with a double wall pipeline system as above described connected at each of three fitting openings. The fitting 40 is comprised of T-shaped inner housing 41 having externally recessed male terminals 42 with outer ridges 43 near the end of each opening for engaging the inner pipeline 12. As shown, the inner pipeline 11 is forced over the ridges 43 of the recessed male terminal a sufficient distance that it will remain in place. The inner housing 41 is encased by a T-shaped outer housing 44. An annular space 45 exists between the two housings.

A compression connecting assembly 48 is used to secure each double wall pipeline system to the fitting 40 in a liquid-tight fashion so that the annular space 14 between the pipelines is sealed and in communication with the annular space 45 of the fitting. The compression connecting assembly 48 is comprised of an internally threaded coupler nut 49 dimensioned to engage threads on the outside wall of the outer housing 44, a gasket bearing retainer 50, a compression seal 51, a ram compression seat 52 and a gasket 53. The gasket bearing retainer, compression seal, ram compression seat and gasket are as described above with respect to FIG. 1 and perform the same respective functions.

Tightening of the compression connecting assembly 48 ensures that the annular space between the outer pipeline is sealed to the outside. A certain degree of fin distortion is possible. However, the outside seal is retained and the annular space between the outer and inner pipelines is retained. Also, compressive forces from the connecting assembly are sufficient that they are transferred through the support fins to obtain a good seal with the inner pipeline.

Figure 6:
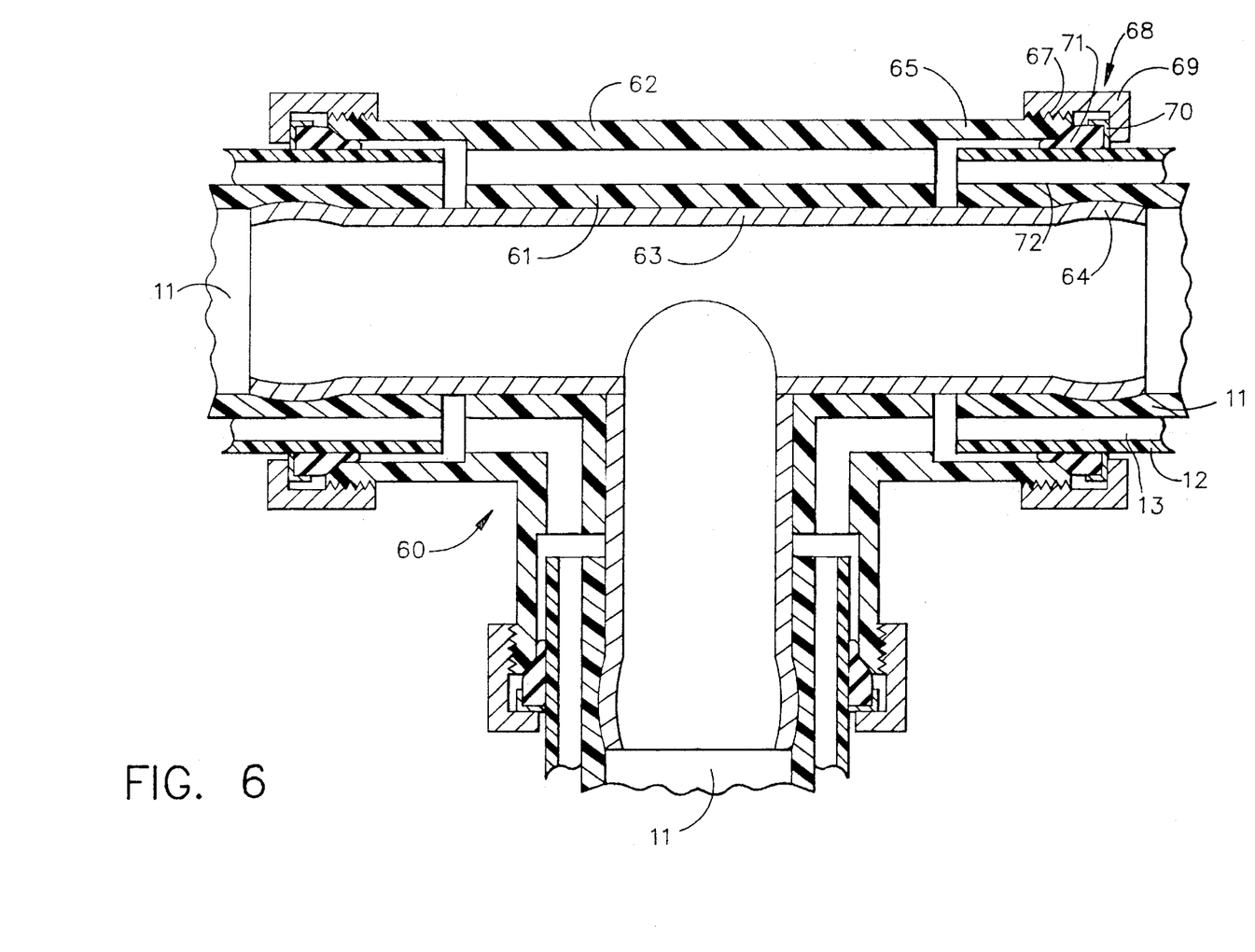
FIG. 6 is a side view in section of still another double wall fitting of the invention.

The double wall compression fitting of FIG. 6 illustrates an embodiment of the invention having still another means of forming a seal between an inner pipeline of a double wall pipeline system and a fitting. The fitting 60 comprises a T-shaped inner housing 61 with a T-shaped outer housing 62 wherein the terminals of the outer housing extend past the terminals of the inner housing. A T-shaped sleeve 63 is encased in the inner housing with its legs extending therefrom. Each leg has a flared end 64 over which the inner pipeline 12 of the double wall pipeline system 11 is forced. The outer housing 62 has an internally recessed male terminal 65 on each end substantially overlying the end of the protruding sleeve 63 extending from the inner housing 61 for purposes discussed below. The outer housing also has external threads 67 on each terminal.

The double wall pipeline systems are attached to the inner and outer housings of the fitting 60 by means of a compression connecting assembly 68. The assembly comprises an internally threaded coupler nut 69, a gasket bearing retainer 70, and a compression seal 71. The components coincide in their form and function with compression connecting assembly components described above with reference to FIG. 5. However, the assembly of FIG. 6 does not require a ram compression seat and gasket due to the particular configuration of the housings. Thus, the compression seal 71 of the fitting 60 is able to form a seal with the outer housing 62 by being forced by the coupler nut into direct contact with the housing's interior wall at or near a terminal.

Tightening of the coupler nut 69 of the compression connecting assembly 68 compresses the compression seal 71 directly against the outer housing end wall. This ensures that the liquid flow path channel of the inner pipelines and the annular flow path channel between the inner and outer pipelines remains separate, i.e. they are sealed as they pass through the fitting 60.

Figure 7:
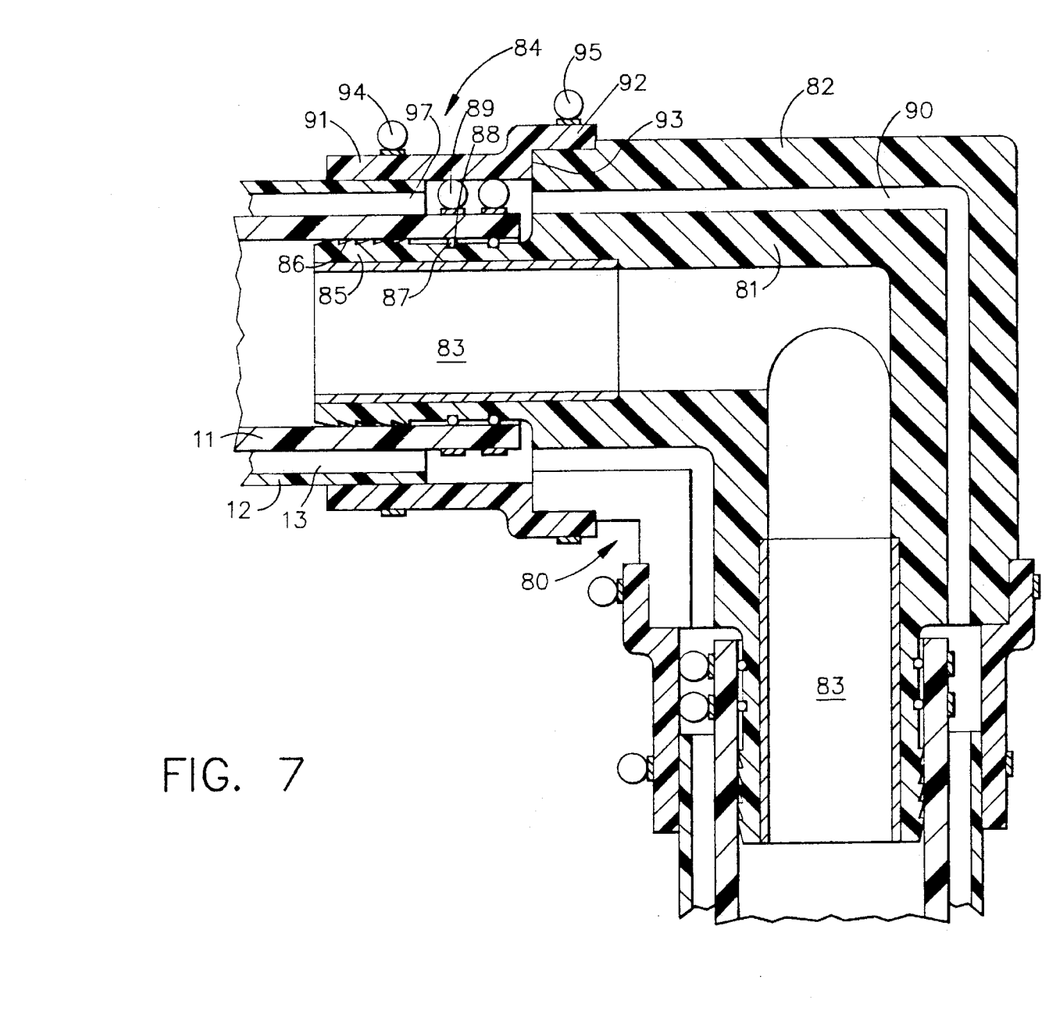
FIG. 7 is a side view in section of an elbow double wall fitting of the invention with a coupler assembly.

An elbow fitting with another compression connecting assembly is illustrated in FIG. 7. The double wall compression fitting 80 comprises right angle elbow inner housing 81 with an outer housing 82 encasing it. A metal sleeve 83 is positioned in each terminal of the inner housing 81 to keep the terminals from crushing from the compression connecting assemblies 84 during use. The inner housing has externally recessed male terminals 85 with ridges 86 extending therearound for enhanced pipeline retention. A set of O-rings 87 positioned in the O-ring grooves 88 on the male terminal 85 aid in obtaining a liquid-tight seal. Optional band clamps 89 on the inner pipeline 11 terminals provide additional sealing when tightened.

The compression connecting assembly 84 is comprised of a coupler 91, band clamps 94 and band clamps 95. The coupler 91 has an inside diameter which allows it to fit over the outer pipeline 12 and an annular flange 92 with an inside diameter which allows it to fit over the outer housing 82 of the double wall fitting 80. The inside wall of the flange 92 abuts against the end wall of the outer housing 82. In an alternative embodiment of the invention, the outer housing 82 and the coupler 91 can be molded, formed or machined to be one piece. This eliminates a need for the band clamps 95.

When the compression connecting assembly is properly positioned on the outer pipeline 12 and outer housing 82, the band clamps are tightened to form a compression seal between the coupler and the outer pipeline and outer housing. Communication is maintained between the annular space 14 between the pipelines and the annular space 90 between the housings.

The fitting 80 is especially easy to install on a double wall pipeline system. It requires a minimum of components. Its ease of installation and reliability make it attractive when economics dictate a less expensive fitting.

Figure 8:
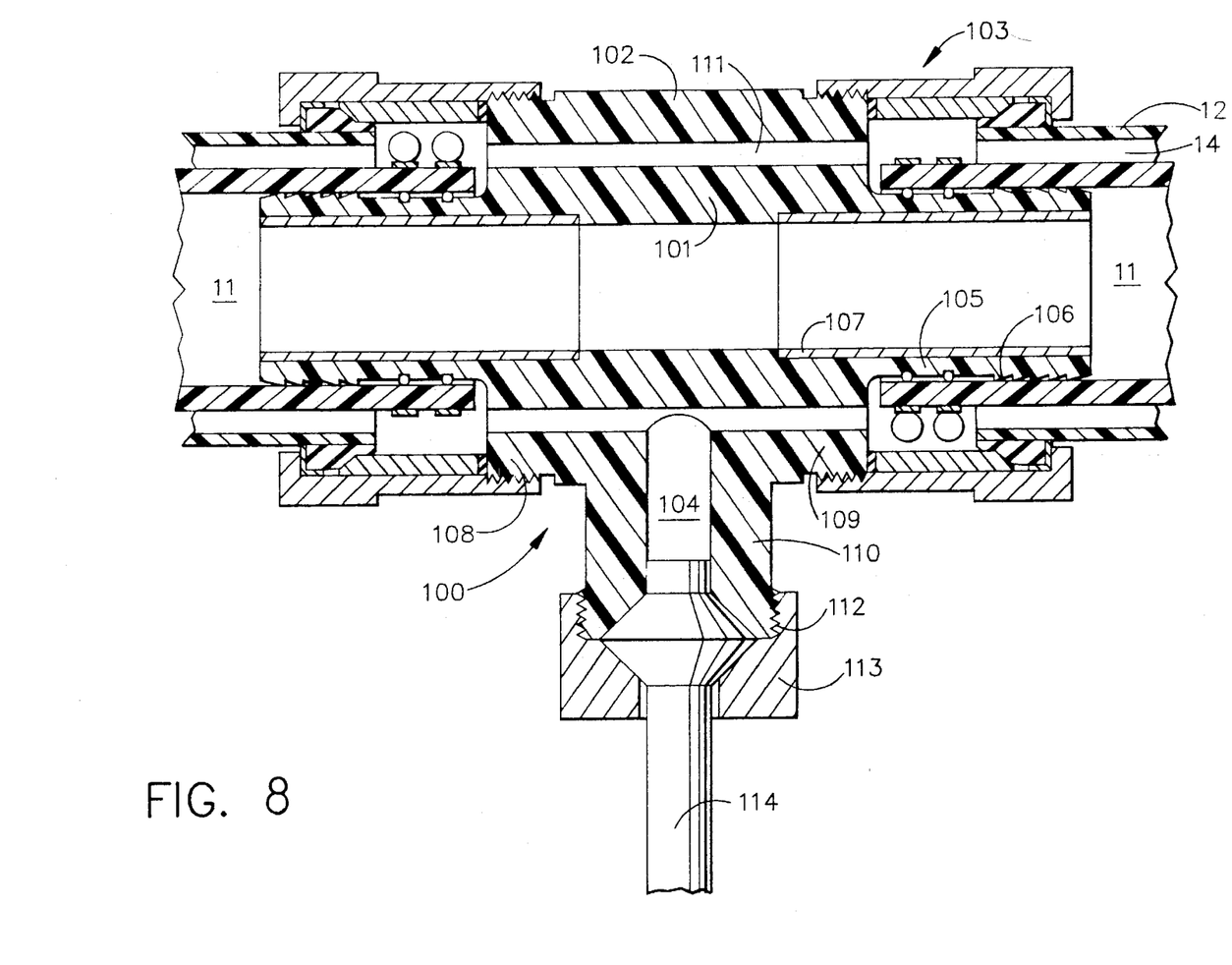
FIG. 8 is a side view of a straight line double wall fitting of the invention having a means for monitoring an annular space between housings.

FIG. 8 illustrates a fitting of the invention having means to monitor an annular space between inner and outer housings of a fitting of the invention to detect pipeline leakage. The fitting 100 is essentially the T-fitting of FIG. 1 modified to have a detection port instead of a third pipeline terminal. The fitting is essentially a two terminal straight coupler. The fitting 100 has an inner housing 101, an outer housing 102, compression connecting assemblies 103 and a detection access port 104. The inner housing is a straight tube with externally recessed male terminals 105 at each end. Exterior ridges 106 are provided on the terminals to engage a pipeline and retain it in place. A metal sleeve 107 is positioned in each terminal to reinforce the inner housing against crushing when the compression connecting assemblies 103 are tightened. The outer housing 102 is T-shaped with each leg having external threads. Two legs 108 and 109 overlie the terminals of the inner housing while a third leg 110 accommodates the detection access port 104. The inner and outer housings have an annular space 111 therebetween.

The double wall pipeline systems are connected to legs 108 and 109 of the fitting 100 by means of the compression connecting assemblies 103. The assemblies and their mode of operation are the same as described above with reference to the double wall fitting of FIG. 1. When connected, the liquid flow channel of the inner pipeline 11 is directed through the inner housing 101 and through another inner pipeline 11. Similarly, the annular space 14 between the inner and outer pipeline is in communication with the annular space 111 between the housings. The flow paths are sealed and remain separate due to the unique fitting 100, including its compression connecting assemblies 103.

The detection access port 104 communicates with the annular space 111 between the housings. The leg 110 is provided with external threads 112 and a coupler nut 113 to hold in place an access line 114. The access line 114 leads to a detection means (not shown). In this embodiment of the invention, the annular space 14 between the pipelines is monitored to determine any leakage in either pipeline. When not in use, the detection access port can be closed with a cap nut.

It should be understood that all manners of fittings needed in the single wall piping industry are now available in the double wall piping industry. Most importantly, the separate flow paths provided by the double wall pipelines and their advantages are retained and continued through use of the double wall fittings of this invention.

While the invention has been described with particular reference to the drawings, other variations and obvious modifications of the described system are considered within the scope of the invention. For example, all manners of attachment means can be used to seal the inner pipelines to the inner housings of the fitting including the disclosed O-rings, band clamps and ridges as well as adhesives, threads, etc. All such obvious modifications are considered within the coverage of the appended claims.

What is claimed is:

1. A double wall compression fitting for attachment to a double wall pipeline system having an inner pipeline with terminals for conveying a liquid and an outer pipeline with terminals for containing liquid with an annular space and a multiplicity of longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals;
   b) an outer housing substantially encasing the inner housing in a manner such that an annular space between the housings is formed, said outer housing having at least two terminals; and
   c) a compression connecting assembly which allows the terminals of the inner pipeline to be engaged to the terminals of the inner housing and which is capable of engaging the terminals of the outer pipeline to the terminals of the outer housing, said assembly having a coupler with means to form a seal with the outer pipeline.

2. The double wall compression fitting of claim 1 wherein the terminals of the inner housing are externally recessed and extend a sufficient distance beyond the terminals of the outer housing to accommodate band clamps around the inner housing terminals to secure the inner pipeline of the double wall pipeline system thereto.

3. The double wall compression fitting of claim 2 further comprising at least one O-ring positioned on each of the externally recessed terminals of the inner housing to ensure a sealed connection between each said terminal and each of the inner pipelines.

4. The double wall compression fitting of claim 1 wherein a band clamp is used to compress the coupler to the outer pipeline.

5. The double wall compression fitting of claim 1 wherein the outer housing has externally threaded terminals, the coupler is a coupler nut with matching internal threads and further having a compression seal positioned within the coupler nut to make sealing contact with the outer pipeline upon tightening of the coupler nut.

6. The double wall compression fitting of claim 5 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

7. The double wall compression fitting of claim 6 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

8. The double wall compression fitting of claim 7 wherein the compression connecting assembly further comprises a ram compression seat and a gasket in contact with the compression seal so that upon tightening of the coupler nut, the compression seal is forced to engage the ram compression seat and gasket to form a seal.

9. The double wall compression fitting of claim 1 further wherein the inner housing has a metal sleeve in at least the terminals thereof to resist crushing when a compressive force is exerted thereon.

10. The double wall compression fitting of claim 9 wherein each end of the metal sleeve has a flared end dimensioned to hold the inner pipeline in a sealed fashion.

11. A double wall compression fitting for attachment to a double wall pipeline system having an inner pipeline with terminals for conveying a liquid and an outer pipeline with terminals for containing liquid with an annular space and a multiplicity of longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals, wherein said terminals are externally recessed and extend a sufficient distance beyond the terminals of an outer housing to accommodate band clamps around said inner housing terminals to secure the inner pipeline of the double wall pipeline system thereto;

b) an outer housing substantially encasing the inner housing in a manner such that an annular space between the housings is formed, said outer housing having at least two terminals; and c) a compression connecting assembly to engage the terminals of the outer pipeline to the terminals of the outer housing while ensuring that the annular space between the inner and outer pipelines is maintained, said assembly having a coupler with means to form a seal with the outer pipeline.

12. The double wall compression fitting of claim 11 wherein a band clamp is used to compress the coupler to the outer pipeline.

13. The double wall compression fitting of claim 11 wherein the outer housing has externally threaded terminals, the coupler is a coupler nut with matching internal threads and further having a compression seal positioned within the coupler nut to make sealing contact with the outer pipeline upon tightening of the coupler nut.

14. The double wall compression fitting of claim 13 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

15. The double wall compression fitting of claim 14 wherein the compression connecting assembly further comprises a gasket bearing retainer positioned within the coupler nut, said gasket bearing retainer being a ring which fits over the outer pipeline and in contact with the compression seal to absorb force from the coupler nut and transmit it to the compression seal.

16. The double wall compression fitting of claim 15 wherein the compression connecting assembly further comprises a ram compression seat and a gasket in contact with the compression seal so that upon tightening of the coupler nut, the compression seal is forced to engage the ram compression seat and gasket to form a seal.

17. A double wall compression fitting for attachment to a double wall pipeline system having an inner pipeline with terminals for conveying a liquid and an outer pipeline with terminals for containing liquid with an annular space and a multiplicity of longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals;

b) an outer housing substantially encasing the inner housing in a manner such that an annular space between the housings is formed, said outer housing having at least two externally threaded terminals; and c) a compression connecting assembly to engage the terminals of the outer pipeline to the terminals of the outer housing, said assembly having a coupler nut with matching internal threads to engage the externally threaded terminals of the outer housing and a compression seal positioned within the coupler nut to form a seal with the outer pipeline upon tightening of the coupler nut.

18. The double wall compression fitting of claim 17 wherein the compression seal is a compressible annular ring having an inside diameter sufficient to fit over the outer pipeline and an outside diameter sufficient to fit within the coupler nut whereinupon a compressive force from the coupler nut causes the compression seal to make sealing contact with the outer pipeline.

19. The double wall compression fitting of claim 18 wherein the terminals of the inner housing are externally recessed with ridges thereon and extend a sufficient distance beyond the terminals of the outer housing to secure the inner pipeline of the double wall pipeline system thereto.

20. A double wall compression fitting for attachment to a double wall pipeline system having an inner pipeline with terminals for conveying a liquid and an outer pipeline with terminals for containing liquid with an annular space and a multiplicity of longitudinally running support fins between the pipelines wherein the fitting is capable of continuing the functions of the inner pipeline and outer pipeline by connecting to the double wall pipeline system in a manner such that a sealed connection is made with the inner pipeline and a sealed connection is made with the outer pipeline and the annular space between the pipelines is in communication with an annular space in the fitting, said double wall compression fitting, comprising:

a) an inner housing having at least two terminals, wherein said terminals are externally recessed and extend a sufficient distance beyond the terminals of an outer housing to accommodate band clamps around said inner housing terminals to secure the inner pipeline of the double wall pipeline system thereto;

b) an outer housing substantially encasing the inner housing in a manner such that an annular space between the housings is formed, said outer housing having at least two externally threaded terminals; and c) a compression connecting assembly to engage the terminals of the outer pipeline to the terminals of the outer housing, said assembly having a coupler nut with matching internal threads to engage the externally threaded terminals of the outer housing and a compression seal positioned within the coupler nut to make sealing contact with the outer pipeline upon tightening of the coupler nut.

* * * * *